United States Patent [19]
Simon

[11] 3,778,919
[45] Dec. 18, 1973

[54] HOOK EXTRACTOR PLIERS
[76] Inventor: James O. Simon, 2215 W. 15th St., Marion, Ind. 46952
[22] Filed: Mar. 14, 1972
[21] Appl. No.: 234,561

[52] U.S. Cl. .................. 43/53.5, 81/426, 81/5.1
[51] Int. Cl. ............................................. A01k 97/00
[58] Field of Search .............. 81/426, 5.1 R, 425 R, 81/418, 419; 7/1 H, 3 R; 43/53.5

[56] References Cited
UNITED STATES PATENTS
2,591,649   4/1952   Whiting .................................. 7/5.4
2,995,860   8/1961   Flagstad .......................... 81/418 X Primary Examiner—Harold D. Whitehead
Assistant Examiner—Roscoe V. Parker
Attorney—Watson, Cole, Grindle & Watson

[57] ABSTRACT

Hook extractor pliers having a push-plate on one of the jaws thereof, the plate facing toward the other pliers jaw which has a slot therein for accommodating the plate. A notch provided at the base of the plate permits the pliers to be guided along the shank of the hook and moved toward the bent portion thereof for disconnecting the hook from the mouth of the fish after which the jaws are closed to firmly grasp the hook therebetween for completely removing the hook from the fish.

3 Claims, 3 Drawing Figures

PATENTED DEC 18 1973　　3,778,919

HOOK EXTRACTOR PLIERS

This invention relates generally to an extractor pliers and more particularly to a pliers specially designed for removing a hook from the mouth of a fish in a quick and convenient manner.

As most fishermen will readily appreciate, removal of fish hooks by hand after a fish has been caught can be a somewhat hazardous operation in that any abrupt movement of the fish may cause the hook to pierce the fisherman's hand during removal. Moreover, the hook may be imbedded deeply within the throat of the fish, thereby increasing the potential risk of bodily harm for the fisherman. Tools such as those found in the average household, e.g., the standard pliers, have been used for hook removal, although it has been found that little control with the use of such tools is available since the hook cannot easily be manipulated, even after it has been firmly grasped. Any abrupt movement of the fish makes it quite difficult to maintain the grasp on the hook and disengage it from the fish's mouth without either bending the hook or completely tearing the mouth. A specially designed extractor pliers is therefore provided to facilitate efficient and fast removal of a hook from the mouth of a fish, the pliers being capable of easy control and manipulation of the hook during removal at all times. This is the principal object of the present invention.

Another object of this invention is to provide such an extractor pliers as having a push-plate on one of its jaw members which extends toward the other jaw member thereof, a groove being provided in the other jaw member for the reception of the plate when the jaw members are moved toward one another. Also, the plate has a notch provided at the base portion thereof to facilitate a guiding of the pliers along the shank of the hook toward and in contact with the bent portion of the hook for disconnecting the hook from the mouth of the fish, after which the jaws are moved toward one another to clamp the hook therebetween before removal of the hook from the fish.

A further object of this invention is to provide such a pliers wherein the notch at the base portion of the push-plate opens outwardly toward the outer end of the jaw members.

A still further object of the present invention is to provide such a pliers wherein the jaw members are needle-nosed to facilitate easy entry thereof within the mouth of the fish.

Other objects, advantages and novel features of the invention will become apparent from the following detailed description of the invention when considered in conjunction with the accompanying drawings wherein.

Figure 1:
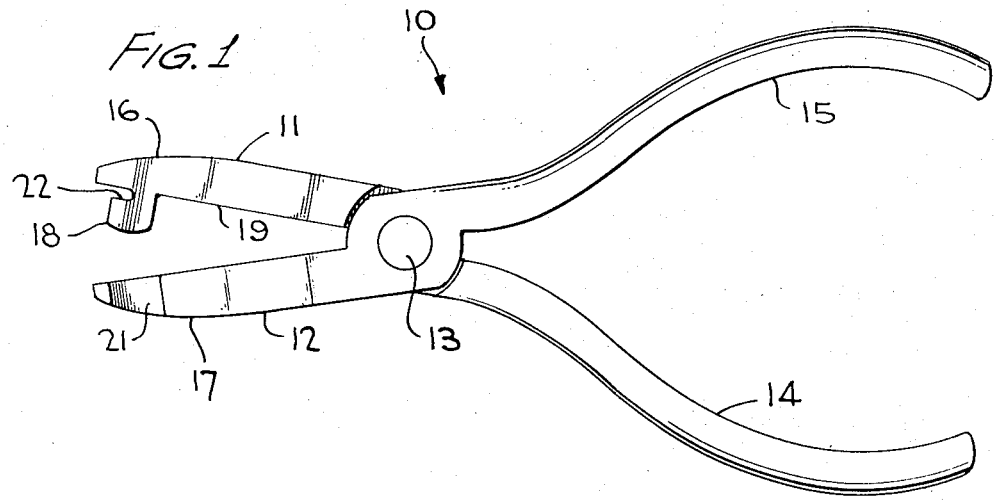
FIG. 1 is a perspective side view of the hook extractor pliers in accordance with the present invention.

Turning now to the drawings wherein like reference characters refer to like and corresponding parts throughout the several views, there is shown a hook extractor pliers, generally designated 10, as comprising a pair of jaw members 11 and 12 interconnected in the normal manner by means of pivot pin 13 and each being provided with respective handles 14 and 15 to facilitate movement in the normal manner toward and away from one another. As can be seen in the drawings, the pliers are of the needle-nose type wherein each of the jaw members 11 and 12 is relatively slender, with their respective outer surfaces 16 and 17 tapering toward one another at the outer end thereof.

Figure 3:
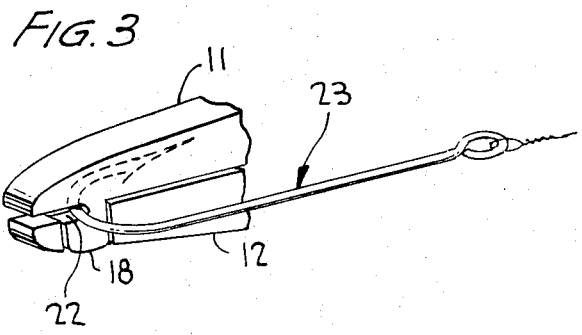
FIG. 3 is a perspective view of the jaw members closed about the hook to facilitate easy hook removal from the fish.

A push-plate 18 is provided at the inner surface 19 of the jaw member 11, near the outer end threof, and extends toward jaw member 12. This plate is shown as being substantially rectangular in cross-section, although it should be understood that it may be also cylindrical in cross-section, or any other cross-sectional shape if desired. A groove 21, provided in a side wall of jaw member 12, is of a cross-sectional dimension substantially equal to that of push-plate 18. Accordingly, the plate may be fully received within this groove when the jaw members are moved completely toward one another as shown in FIG. 3.

Figure 2:
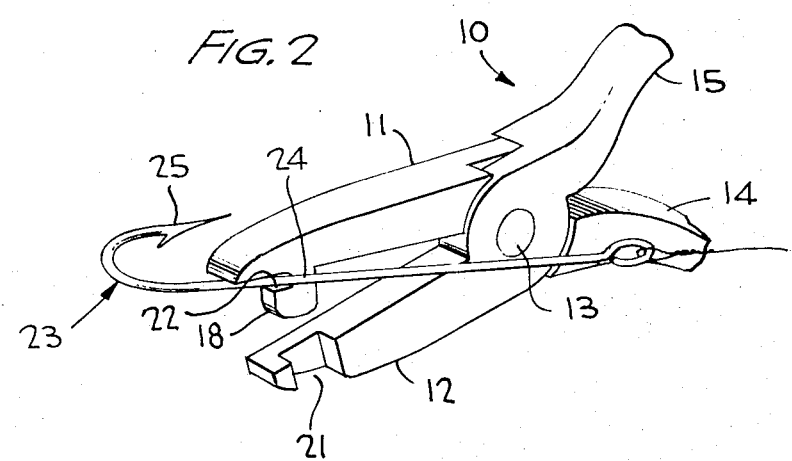
FIG. 2 is a perspective view showing the open jaw members of the pliers guided along the shank of a hook before extraction thereof.

The guide means provided for the pliers comprises a notch 22 which is provided at the base portion of the push-plate 18 and opens outwardly toward the outer end of the jaw member 11. Accordingly, a hook 23, shown in FIGS. 2 and 3, may be removed from the mouth of a fish (not shown) by simply inserting the open jaw members into the mouth of the fish and moving them along the shank 24 of the hook. Such movement is illustrated in FIG. 2 where it can be seen that notch 22 permits guide member 11 to be guided along shank 24 of the hook while the jaw members are maintained slightly open by the operator. Guiding the pliers in such manner minimizes any likelihood of slippage as the pliers are moved along the hook shank. Slight pressure exerted by the operator in the direction of the hook shank will assure that the pliers will be quickly and efficiently moved toward the bent portion 25 of the hook. When the jaw 11 makes contact with bent portion 25, the fish's mouth may be easily forced off the pointed end of the hook. The jaw members 11 and 12 are therefore moved completely toward one another so as to firmly grasp the hook therebetween, as clearly shown in FIG. 3. The extractor pliers are then pushed slightly downwardly into the throat of the fish so as to completely disengage the hooked fish before slightly turning the hook in one direction and lifting it out of the mouth of the fish. The firm grasp of the hook by the jaw members 11 and 12, with the use of the pliers of the present invention, permits the operator to remove the hook in a convenient and efficient manner, and in a smooth, simple and single operation.

Obviously, many modifications and variations of the present invention are possible in the light of the above teachings. For example, the cross-sectional shape of plate 18 and groove 21 may be other than rectangular, as discussed above, and the location thereof with respect to jaw members 11 and 12 may also vary. For example, groove 21 may be located at the opposite side wall of jaw member 12, with the plate 18 at a side of its jaw member corresponding thereto, or a slot may be provided in jaw member 12 in lieu of the groove 21 with the plate 18 located directly thereabove on its jaw member 11. It is therefore to be understood that within the scope of the appended claims, the invention may be practiced otherwise than as specifically described.

What is claimed is:

1. Hook extractor pliers comprising a pair of interconnected jaw members movable toward and away from one another, one of said jaw members having a notch therein, the inner surface of said one jaw member defining one of the walls of said notch, a portion of said one jaw member extending outwardly of said inner surface toward the other of said jaw members, said portion containing the remaining walls of said notch, and a groove located in said other jaw member, said groove opens toward a side surface of said other jaw member and being of sufficient depth for accommodating said portion when said jaw members are moved toward one another, whereby the pliers are guided by said notch along the shank of a hook to be removed from the mouth of a fish and are moved toward the bent portion thereof for disconnecting the hook from the fish's mouth, the hook being clamped only between said one member inner surface and the inner surface of said other member after having been moved toward one another to facilitate removal of the hook from the fish's mouth.

2. The hook extractor pliers according to claim 1 wherein said notch opens toward the outer end of said one jaw member.

3. Hook extractor pliers, according to claim 1, wherein the outer surface of each said jaw member tapers toward one another at the outer end of said jaw members.

* * * * *